US012236362B2

(12) United States Patent
Li et al.

(10) Patent No.: US 12,236,362 B2
(45) Date of Patent: Feb. 25, 2025

(54) INFERENCE COMPUTING APPARATUS, MODEL TRAINING APPARATUS, INFERENCE COMPUTING SYSTEM

(71) Applicant: BOE TECHNOLOGY GROUP CO., LTD., Beijing (CN)

(72) Inventors: Zhaoyue Li, Beijing (CN); Dong Chai, Beijing (CN); Yuanyuan Lu, Beijing (CN); Hong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1059 days.

(21) Appl. No.: 17/044,276

(22) PCT Filed: Dec. 20, 2019

(86) PCT No.: PCT/CN2019/127048
§ 371 (c)(1),
(2) Date: Sep. 30, 2020

(87) PCT Pub. No.: WO2021/120181
PCT Pub. Date: Jun. 24, 2021

(65) Prior Publication Data
US 2021/0209488 A1 Jul. 8, 2021

(51) Int. Cl.
*G06N 5/04* (2023.01)
*G06N 3/08* (2023.01)
*G06T 7/00* (2017.01)

(52) U.S. Cl.
CPC ............... *G06N 5/04* (2013.01); *G06N 3/08* (2013.01); *G06T 7/0004* (2013.01)

(58) Field of Classification Search
CPC .. G06N 5/04; G06N 5/00; G06N 3/08; G06N 3/02; G06T 7/0004; G06T 7/0002
(Continued)

(56) References Cited

U.S. PATENT DOCUMENTS 10,481,579 B1 * 11/2019 Putman .................. G05B 19/19
2010/0152878 A1 * 6/2010 Chu ........................ G05B 17/02
700/110
(Continued)

FOREIGN PATENT DOCUMENTS

CN 101242549 A 8/2008
CN 103078897 A 5/2013
(Continued)

OTHER PUBLICATIONS

Huang et al., "Intelligent fuzzy wavelet system for electronic parts appearance quality prediction", 2008 IEEE International Joint Conference on Neural Networks, Jun. 2008, pp. 271-278. (Year: 2008).*
(Continued)

*Primary Examiner* — Hwei-Min Lu
(74) *Attorney, Agent, or Firm* — Procopio, Cory, Hargreaves & Savitch LLP

(57) ABSTRACT

An inference computing apparatus comprises at least one processor and a memory with program instructions stored therein, the program instructions can be executed by the at least one processor to cause the inference computing apparatus to perform the following operations: receiving a first inference model from a model training apparatus, the first inference model being obtained through a model training by the model training apparatus based on a first training sample library, the first training sample library comprising training samples from historical data generated in a manufacturing stage; performing an inference computing on data to be processed generated in the manufacturing stage based on the first inference model to obtain the inference result which is sent to a user-side device; and evaluating performance of the first inference model to determine whether the first inference model needs to be updated, and if yes, updating the first inference model.

12 Claims, 7 Drawing Sheets

(58) Field of Classification Search
USPC .................................. 706/47, 46, 15, 25
See application file for complete search history.

(56) References Cited

U.S. PATENT DOCUMENTS

| | | | |
|---|---|---|---|
| 2011/0125678 A1 | 5/2011 | Partridge | |
| 2013/0060807 A1* | 3/2013 | Rambhia | G06F 16/2455 707/769 |
| 2013/0202200 A1* | 8/2013 | Ribnick | G06V 10/7788 382/160 |
| 2015/0324686 A1* | 11/2015 | Julian | G06N 3/08 706/25 |
| 2016/0307115 A1* | 10/2016 | Wu | G06N 20/00 |
| 2018/0322623 A1* | 11/2018 | Memo | G06N 3/084 |
| 2018/0336479 A1* | 11/2018 | Guttmann | G06V 10/764 |
| 2018/0348717 A1 | 12/2018 | Zhao et al. | |
| 2019/0012576 A1* | 1/2019 | Liu | G06F 18/22 |
| 2019/0057314 A1* | 2/2019 | Julian | G06N 5/04 |
| 2019/0197356 A1 | 6/2019 | Kurita et al. | |
| 2019/0294927 A1* | 9/2019 | Guttmann | G10L 15/065 |
| 2019/0317754 A1* | 10/2019 | Mosquera | G06F 8/77 |
| 2020/0193313 A1* | 6/2020 | Ghanta | G06N 20/00 |
| 2020/0258006 A1* | 8/2020 | Chen | G06N 99/00 |

FOREIGN PATENT DOCUMENTS

| | | | | |
|---|---|---|---|---|
| CN | 107256009 A | | 10/2017 | |
| CN | 107766889 A | | 3/2018 | |
| CN | 109635171 A | | 4/2019 | |
| CN | 109740661 A | | 5/2019 | |
| CN | 110378900 A | * | 10/2019 | ......... G01N 21/8851 |
| CN | 110554047 A | * | 12/2019 | ............ G01N 21/01 |
| JP | 2019114116 A | | 7/2019 | |
| JP | 2019158684 A | | 9/2019 | |

OTHER PUBLICATIONS

Ghanta et al., "Interpretability and Reproducability in Production Machine Learning Applications", 2018 17th IEEE International Conference on Machine Learning and Applications, Dec. 2018, pp. 658-664. (Year: 2018).*

Ghanta et al., "Interpretability and Reproducability in Production Machine Learning Applications", 2018 17th IEEE International Conference on Machine Learning and Applications (ICMLA), Dec. 2018, pp. 658-664 (Year: 2018).*

Yokoyama, "Machine Learning System Architectural Pattern for Improving Operational Stability", 2019 IEEE International Conference on Software Architecture Companion, Mar. 2019, pp. 267-274. (Year: 2019).*

Supplementary European Search Report for related EP Application No. 19 955 399.1, mailed Jan. 5, 2023 (9 pages).

Office Action dated Oct. 31, 2023, in Japanese Patent Application No. 2021-571382.

Kawakami Akihisa, "Improve the efficiency of AI learning and trial implementation and coordinate with edge IoT processing," Nikkei Systems, 2019, pp. 54-61.

* cited by examiner

INFERENCE COMPUTING APPARATUS, MODEL TRAINING APPARATUS, INFERENCE COMPUTING SYSTEM

CROSS-REFERENCE TO RELATED APPLICATIONS

This application is a national phase entry under 35 USC 371 of International Patent Application No. PCT/CN2019/127048 filed on 20 Dec. 2019, which is incorporated herein by reference in its entirety.

TECHNICAL FIELD

The present disclosure relates to the field of cloud computing technology, more particularly, to an inference computing apparatus, a model training apparatus, and an inference computing system.

BACKGROUND

Cloud computing technology has strong computing power, high availability, and high scalability. In the meantime, in cloud computing, applications are deployed on cloud apparatuses, and users can obtain application services from cloud apparatuses on demand, which improves the convenience for users to obtain application services and increases the overall utilization rate of computing resources.

SUMMARY

In an aspect, an inference computing apparatus is provided. The inference computing apparatus includes at least one processor and a memory. The memory has stored therein program instructions that, when executed by the at least one processor, cause the inference computing apparatus to perform the following operations: receiving a first inference model from a model training apparatus, the first inference model being obtained by the model training apparatus through a model training based on a first training sample library, the first training sample library including training samples from historical data generated in a manufacturing stage, and the model training apparatus including a cloud device; performing an inference computing on data to be processed generated in the manufacturing stage based on the first inference model to obtain an inference result, and sending the inference result to a user-side device, the inference computing apparatus being closer to the user-side device than the model training apparatus; and evaluating a performance of the first inference model to determine whether the first inference model needs to be updated, and if the first inference model needs to be updated, updating the first inference model.

In some embodiments of the present disclosure, the historical data includes a product image marked with defect information. The data to be processed includes an original product image generated in the manufacturing stage. The inference result includes defect information in the original product image.

In some embodiments of the present disclosure, updating the first inference model includes: performing a model training based on a second training sample library to obtain a second inference model, or sending a model update request to the model training apparatus to obtain the second inference model, the second training sample library includes training samples from historical data and/or training samples that are from the inference result and subjected to a re-judging; and updating the first inference model with the second inference model in a case where the second inference model meets an update condition.

In some embodiments of the present disclosure, the update condition includes: a test is performed on the second inference model and the second inference model passes the test. The test includes: evaluating a performance of the second inference model based on test samples; and if the performance meets evaluation requirements, determining that the second inference model passes the test.

In some embodiments of the present disclosure, the update condition further includes: a gray-scale deployment is performed on the second inference model, the performance of the second inference model is evaluated during the gray-scale deployment, and the performance of the second inference model meets the evaluation requirements.

In some embodiments of the present disclosure, the update condition further includes: configuration information of the second inference model is verified, and the configuration information matches with the inference computing to be performed.

In some embodiments of the present disclosure, before performing the model training to obtain the second inference model, or before sending the model update request to the model training apparatus to obtain the second inference model, the inference computing apparatus further performs the following operations: determining whether training parameters required for the model training to be performed are within a preset range of training parameters; and if the training parameters are within the preset range, performing the model training; if the training parameters are not within the preset range, sending the model update request to the model training apparatus.

In some embodiments of the present disclosure, the training parameters include: at least one of data size, training duration, and computing power required for the model training.

In some embodiments of the present disclosure, evaluation parameters used for evaluating the performance of the inference model include at least one of accuracy rate, precision rate, recall rate and F Score of the first inference model during an inference computing process. A case where the first inference model needs to be updated according to the performance evaluation includes: a performance of the first inference model fluctuates or decreases, and whether the performance of the first inference model fluctuates or decreases is determined according to a variation of the evaluation parameters in a continuous period of time.

In some embodiments of the present disclosure, updating the first inference model according to the performance evaluation includes: receiving a third inference model, the third inference model being obtained by the model training apparatus through a model training based on an updated first training sample library in a case where the model training apparatus has not received the model update request, and the updated first training sample library including the training samples that are from the inference result and subjected to a re-judging; comparing a performance of the first inference model with a performance of the third inference model, and if the performance of the third inference model is better than the performance of the first inference model, or if an abnormality occurs in the first inference model, updating the first inference model with the third inference model.

In some embodiments of the present disclosure, in a case where the first inference model is updated with the second inference model, the inference computing apparatus further performs the following operations: performing a performance evaluation on the second inference model, and comparing a performance of the first inference model with a performance of the second inference model; if the performance of the second inference model is worse than the performance of the first inference model, rolling back the second inference model to the first inference model; and performing the model training again, or requesting the model training apparatus to perform the model training again.

In some embodiments of the present disclosure, after obtaining the inference result, the inference computing apparatus further performs the following operations: generating a decision instruction according to the inference result. The defect information includes: the identified original product image having a defect, and defect location and defect type. The decision instruction includes: performing a corresponding defect processing on a product corresponding to the original image having the defect according to the defect information of the original product image.

In another aspect, a model training apparatus is provided. The model training apparatus includes at least one processor and a memory. The memory has stored therein program instructions that, when executed by the at least one processor, cause the model training apparatus to perform the following operations: performing a model training based on a first training sample library to obtain a first inference model, the first training sample library including training samples from historical data generated in a manufacturing stage; sending the first inference model to an inference computing apparatus; performing a model training based on an updated first training sample library to obtain a second inference model in a case where a model update request from the inference computing apparatus is received, the updated first training sample library including training samples that are from an inference result of the first inference model and subjected to a re-judging; and sending the second inference model to the inference computing apparatus.

In some embodiments of the present disclosure, in a process of performing the model training based on the first training sample library or the updated first training sample library, the model training apparatus performs the following operations: generating training task information; generating training configuration data according to the training task information; and obtaining training samples from a corresponding training sample library and performing the model training based on the training samples and the training configuration data to obtain a corresponding inference model.

In some embodiments of the present disclosure, in a process of obtaining the training samples from the corresponding training sample library and performing the model training based on the training samples and the training configuration data to obtain the corresponding inference model, the model training apparatus further performs the following operations: monitoring a model training process; updating the training configuration data when an abnormality occurs in the model training process; and performing the model training based on the training samples and the updated training configuration data.

In some embodiments of the present disclosure, before sending the first inference model or the second inference model to the inference computing apparatus, the model training apparatus further performs the following operations: verifying model version information of the corresponding inference model to determine whether the model version information is correct; if the model version information is correct, sending the corresponding inference model to the inference computing apparatus; and if the model version information is not correct, searching for a corresponding inference model with a model version meeting requirements; if the corresponding inference model is found, sending the corresponding inference model to the inference computing apparatus; and if the corresponding inference model is not found, sending a notification message to the inference computing apparatus.

In some embodiments of the present disclosure, the model training apparatus further includes the first training sample library. The model training apparatus further performs the following operations: updating the first training sample library; performing the model training based on the updated first training sample library to obtain a third inference model in a case where the model update request is not received; sending the third inference model to the inference training apparatus.

In yet another aspect, a computer readable storage medium is provided. The computer readable storage medium has stored therein program instructions that, when executed by a processor, cause the inference computing apparatus to perform the following operations: receiving a first inference model, the first inference model being obtained through a model training based on a first training sample library, and the first training sample library including training samples from historical data; performing an inference computing on data to be processed generated in a manufacturing stage based on the first inference model to obtain an inference result; and evaluating a performance of the first inference model to determine whether the first inference model needs to be updated, and if the first inference model needs to be updated, updating the first inference model.

In yet another aspect, a computer readable storage medium is provided. The computer readable storage medium has stored therein program instructions that, when executed by a processor, cause a model training apparatus to perform the following operations: performing a model training based on a first training sample library to obtain a first inference model, the first training sample library including training samples from historical data generated in a manufacturing stage; sending the first inference model to an inference computing apparatus; performing a model training based on an updated first training sample library to obtain a second inference model in a case where a model update request from the inference computing apparatus is received, the updated first training sample library being obtained by updating the first training sample library using training samples that are from an inference result of the first inference module and subjected to a re-judging; and sending the second inference model to the inference computing apparatus.

In yet another aspect, an inference computing system is provided. The inference computing system includes the inference computing apparatus described in any one of the above embodiments, and the model training apparatus described in any one of the above embodiments.

DETAILED DESCRIPTION

Below, some embodiments of the present disclosure will be described in combination with the accompanying drawings. Obviously, the described embodiments are merely some but not all of the embodiments of the present disclosure. All other embodiments made on the basis of the embodiments of the present disclosure by a person of ordinary skill in the art shall be included in the protection scope of the present disclosure.

In industrial production, due to problems in equipment, parameters, operations, and environment, the produced products may not meet production requirements or even be defective. Therefore, substandard and defective products need to be removed timely after every process to avoid accumulation of defective products. Further, it is possible to predict an operating state of a production system according to real-time monitoring data in the production equipment, such as changes in temperature, pressure, humidity, etc., so as to prevent problems such as product deficiencies or equipment damage in advance.

With continuous development of artificial intelligence, factories can perform model training according to a large amount of production data using a machine learning method to obtain an inference model, and apply the model to makes inferences and predictions in subsequent production, thereby replacing operators and data analysts of the factories, improving production efficiency and reducing labor costs. Machine learning algorithms include support vector machines (SVM), AdaBoost, decision trees, random forests, and deep learning algorithms based on neural networks and the like.

Cloud computing is a type of distributed computing. In cloud computing, a data calculation processing program is broken down into multiple small calculation processing programs through the Internet "cloud". Therefore, cloud computing has strong computing power, high availability, and high scalability. A large volume of production data is generated in the production process in a factory, and with the production data, cloud computing can train an inference model for processing the large volume of production data, and perform inference computing on the production data with the inference model. In this way, a system composed of multiple servers (i.e., a cloud device) performs inference computing on data to be processed uploaded from a user-side apparatus (i.e., production equipment in the factory) to obtain inference results, analyzes the inference results to obtain a cloud decision, and then send the cloud decision to the user-side device, thereby implementing an Internet of Things in the production process. Here, the computing architecture described above is referred to as a user-cloud computing architecture.

Figure 1:
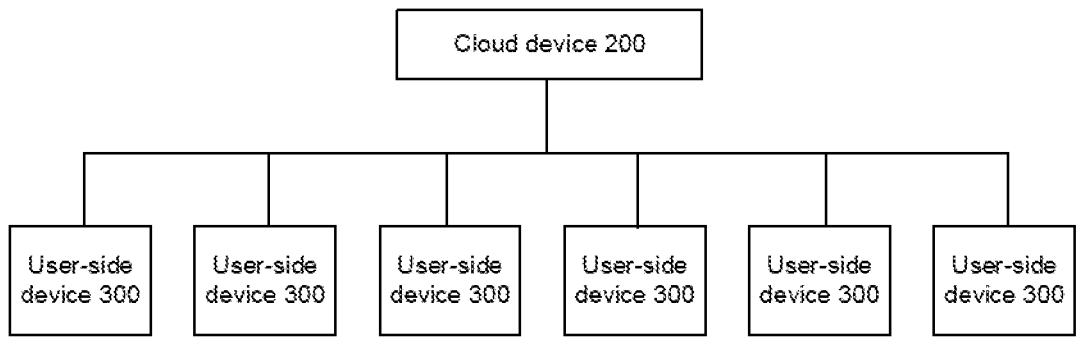
FIG. 1 is a structural view of a user side-cloud computing architecture according to the related art.

The user-cloud computing architecture is described below with reference to FIG. 1. The user-side device 300 uploads the data to be processed (i.e., the production data generated by the production equipment) to the cloud device 200. The cloud device performs inference computing on the data and obtains the decision result, and then sends the decision result back to the user-side device 300. The user-side device 300 acts correspondingly according to the received decision result. In this way, unified management of the user-side device 300 is achieved.

However, due to the large volume of data uploaded from the user-side device 300, in an uploading process of the data, a network bandwidth and network management authority used for uploading the data will greatly limit an upload speed, resulting in poor timeliness of data processing. In addition, the large volume of data needs to be stored after being uploaded to the cloud device 300, which will occupy many resources of the cloud device 300 and thus bring a heavy burden on the cloud device.

In order to solve the problems of the user-cloud computing architecture described above, a user side-edge side-cloud computing architecture may be used to process the production data generated in the production process.

Figure 3:
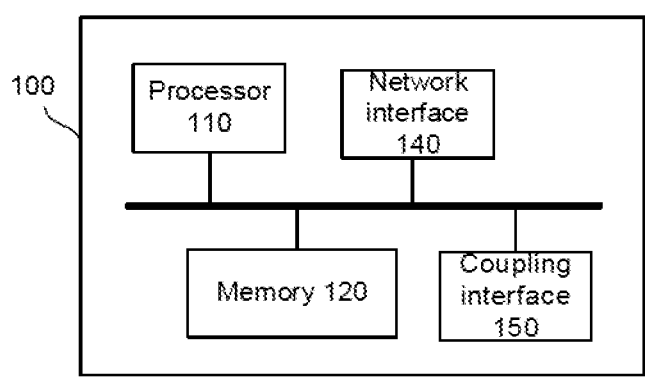
FIG. 3 is a structural view of an inference computing apparatus according to some embodiments of the present disclosure.
Figure 4:
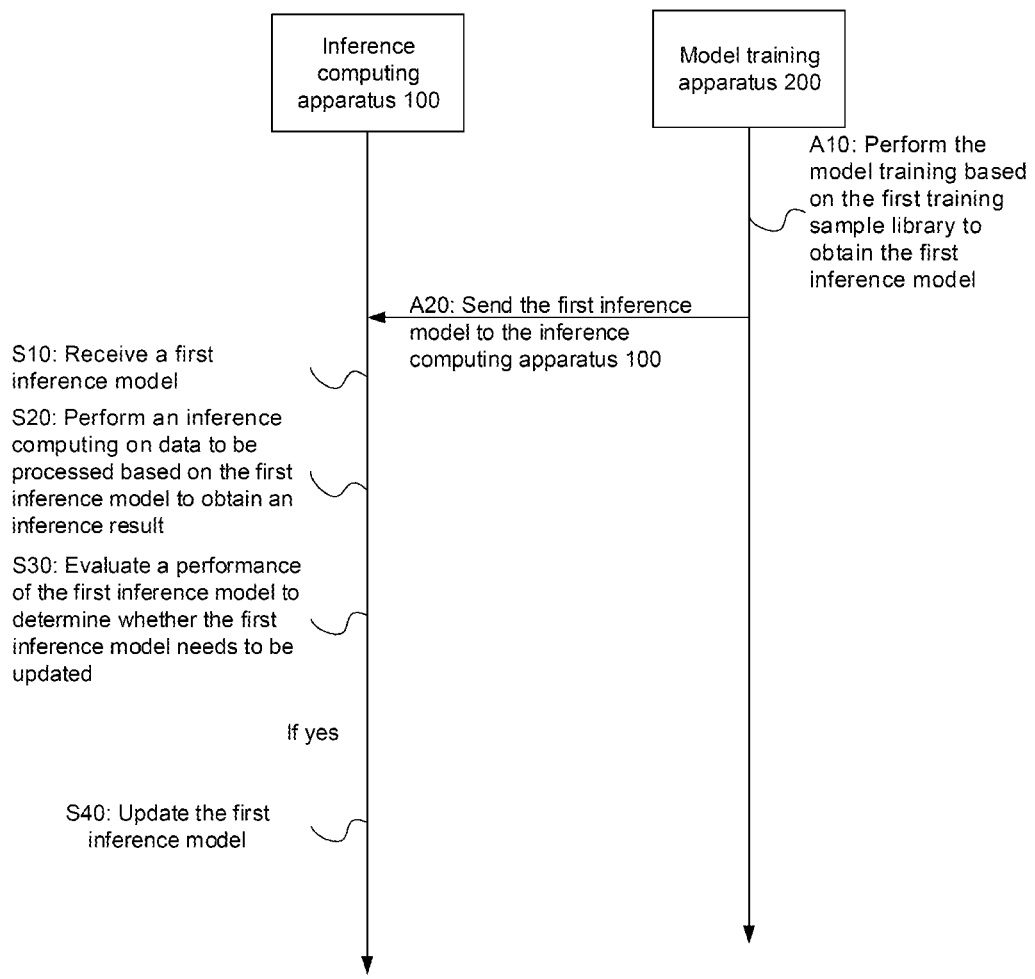
FIG. 4 is a diagram showing an interaction between an inference computing apparatus and a model training apparatus according to some embodiments of the present disclosure.
Figure 5:
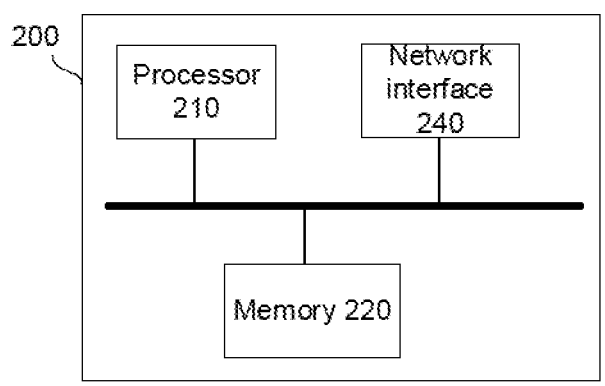
FIG. 5 is a structural view of a model training apparatus according to some embodiments of the present disclosure.

Referring to FIGS. 3 to 5, some embodiments of the present disclosure provide an inference computing apparatus 100, which includes at least one processor 110 and a memory 120. The memory 120 stores program instructions. When executed by the at least one processor 110, the program instructions cause the inference computing apparatus 100 to perform the following steps S10 to S40.

In S10, a first inference model is received from a model training apparatus 200. The first inference model is obtained by the model training apparatus 200 through a model training based on a first training sample library. The first training sample library includes training samples from historical data generated in a manufacturing stage, and the model training apparatus 200 includes a cloud device. That is, the model training apparatus 200 can be a cloud device.

In an example, the neural network model is trained by the model training apparatus 200, which includes the following steps: selecting a network topology; using a group of training data representing network modeled problems; and adjusting a weight until the network model appear to have minimal error for all examples of the training sample library. For example, during a supervised learning training process for neural networks, an output produced by the network in response to an input representing the example in training dataset is compared with an output of the example marked as "correct"; an error signal representing a difference between the output and the marked output is calculated; and when the error signal is propagated backward through layers of the network, a weight associated with a connection herein is adjusted to minimize the error. When the error of each output generated from the examples of the training dataset is minimized, the neural network model is considered to be "trained" and can be used for inference tasks of artificial intelligence.

A buffer area of a large number of parameters, activation values and gradient values are involved in a process of inference and training of a neural network model. Each of the values is completely updated in every training process, which requires very high calculating power and throughput capacity. With a simple programming model, strong parallel capability, and high video memory bandwidth, a Graphics Processing Unit (GPU) is extremely efficient in processing calculations associated with training deep neural networks. Therefore, by using a GPU cluster integrated with a plurality of GPUs, it may be possible to effectively improve the training and inference speed of the neural network model.

The inference model may be a neural network model, such as a feedforward neural network model, a convolutional neural network (CNN) model, a recurrent neural network (RNN) model, or a generative confrontation network (GAN) model, which is not limited thereto, and other neural network models known by those skilled in the art may also be used.

In S20, an inference computing is performed on data to be processed generated in the manufacturing stage based on the first inference model to obtain an inference result, and the inference result is sent to a user-side device. The inference computing apparatus 100 is closer to the user-side device than the model training apparatus.

Figure 2:
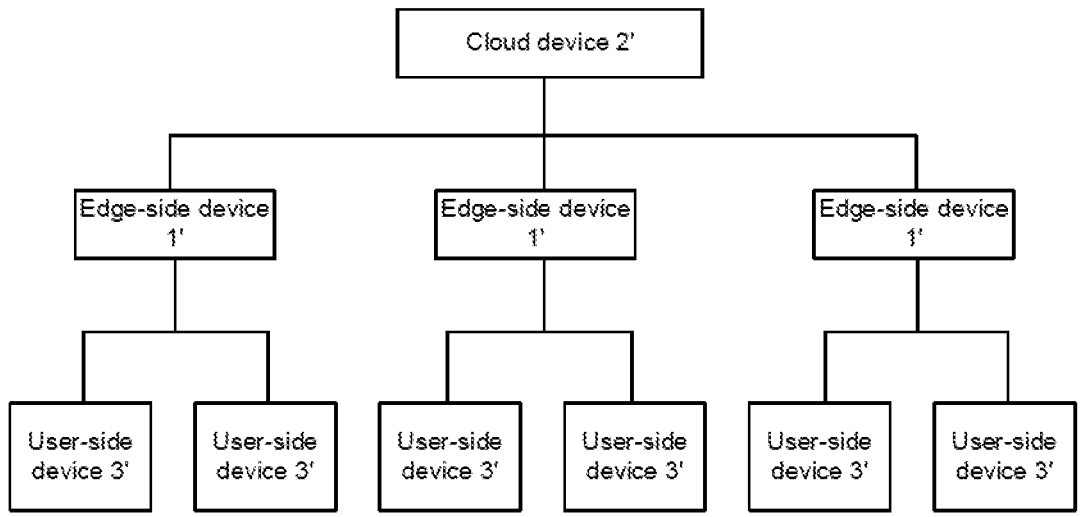
FIG. 2 is a structural view of a cloud user side-edge side-cloud computing architecture according to the related art.

In one example, referring to FIG. 2, the inference computing apparatus 100 is an edge-side device 1', the model training apparatus 200 is the cloud device 2', and the edge-side device 1' is deployed between the user-side device 3' and the cloud device 2' and is close to an end of the user-side device 3'. The edge-side device 1' performs an inference computing on the data to be processed from the user-side device 3' with the inference model to obtain a decision result of the edge side, and send the decision result of the edge side to the user-side device 3'. Or, the edge-side device 1' uploads the result to the cloud device 2', and then the cloud device 2' processes and analyzes the uploaded result to obtain the cloud decision result, and send the cloud decision result to the user-side device 3'. In another example, the edge-side device 1' may be integrated into the user-side device 3'. That is, the user-side device 3' generates production data and also performs the inference computing on the production data.

The edge-side device 1' is closer to the user-side device 3' than the cloud device 2'. Therefore, it takes less time to transmit the data to be processed, which improves the timeliness of data processing. Moreover, since there is no need to upload the data to be processed to the cloud device 2', less resources are utilized on the cloud device 2', thereby reducing a burden imposed on the cloud device. In addition, in the user side-edge side-cloud computing architecture, the cloud device 2' can be leveraged to conduct the model training with its strong computing power without a need to feedback a decision in real time.

It will be noted that the inference model in the edge-side device 1' refers to an algorithm structure which performs an inference computing using some algorithms (such as a machine learning algorithm). Herein, a model training needs to be performed to obtain the inference model that meets requirements of the inference computing of the edge device 1'. The model training means performing multiple iterations and calculations on a large volume of training samples, extracting specific features of these training samples and ultimately obtaining the algorithm structure and parameter values that converge on a dataset with the specific features, that is, obtaining an inference model capable of identifying the data with the specific features.

A large number of training datasets used for the model training, validation datasets, and test datasets for testing a trained model all include the original image samples and corresponding marking information. The original image samples in the three datasets may completely overlap, partly overlap or don't overlap with each other. Accordingly, the training datasets, the verification datasets, and the test datasets may completely overlap, partly overlap or don't overlap with each other. It is ideal that there is no overlap at all, in which case the trained models are more reliable.

For example, during a production of a display panel, it is necessary to take pictures of the display panel after each process to obtain the images of the display panel (such as an image of an array substrate), so as to obtain defect information of display panel by identifying whether there are defects in the images as well as the types and locations of defects, to mark the defective display panel and its defect information, and to repair the panel using corresponding repair processes to different defects. A computer vision recognition can be realized by the image recognition through the neural network model with deep learning, in which the inference model is sent to the edge side device 2' after a sample training by the cloud device 1'. Images generated by the user side 3' are quickly subjected to the inference computing by the edge-side device 2', which eliminates a bandwidth pressure and delay in transmission of cloud computing.

For example, a step of identifying the defect in the images with the neural network model are as follows: scaling the product images to a fixed pixel M×N first (this step may also be omitted), and then sending the M×N images to the deep convolutional neural network, for example, VGGNet, ResNet and MobileNet, etc.; obtaining feature maps through multiple convolutional layers, activation layers, and pooling layers; inputting the feature maps into a filtering area network (ZF, SSD, and RPN, etc.), and obtaining a proposal region by calculations; and then performing operations such as a convolution and pooling on the proposal region to get a proposal feature of the proposal region which is sent to fully-connected and softmax networks for classification (herein "classification" means classifying the proposal feature into a certain defect type) so as to get a type with a biggest probability as a final classification result, and record the type and probability. In addition, coordinates and dimensions of the proposal region indicate a location and a size of the defect. The method for identifying product defect content based on a defect model may be a similar variation of the above method or other methods known to those skilled in the art, which is not limited in the present disclosure.

In S30, a performance of the first inference model is evaluated to determine whether the first inference model needs to be updated.

As the data to be processed from the user-side device 3' is continuously generated and updated and data to be processed with new features (features that have not appeared during the model training) continues to appear, the inference computing power of the inference model declines gradually and an accuracy of the edge-side decision result obtained by the inference model decreases therewith. With the production of a display panel as an example, factors such as production of new products, updating of production processes, and upgrading of production equipment may all cause a new type of defect in the production process. Since the new type of defect has not appeared in the training samples during the model training, the inference model is unable to identify the new type of defect. Therefore, the inference model no longer meets the requirements of the defect identification and classification in the manufacturing process.

As mentioned above, the inference model is obtained through the model training with a large number of training samples. The training samples may be regarded as a dataset composed of at least one piece of data, and the training samples may include various types of data. For example, the training data may include images, videos, audio, etc., which are not specifically limited herein. The large number of training samples used to train the first inference model are from the first training sample library, and the training samples in the first training sample library include training samples from the historical data. Herein, the historical data refers to the production data that has been judged and marked with the correct result. For example, the production data is judged manually or by other equipment capable of making correct judgments to obtain the historical data described above. Since the historical data has been marked with a correct result, it can be used as the training sample in the model training.

For example, with the production of the display panel as an example, the data to be processed by the first inference model includes original product images generated in the manufacturing stage, and the inference result of the first inference model includes defect information about the original product images. Herein, the original product images are unprocessed ones, and need to be subjected to the inference computing by the first inference model to obtain defect information of the original product image, for example, defect location and type. The historical data described above includes the product image marked with the defect type. Here, the marked defect type is a correct result. It will be noted that, when evaluating the performance of the first inference model, the inference computing apparatus 100 will compare the inference result obtained by the first inference model after inference computing with the correct result, so as to evaluate the performance of the first inference model. Herein, the correct result is input to the inference computing apparatus 100 after manual judgment.

For example, with the production of the display panel as an example, a worker judges the original product image of the display screen in a production line within a fixed period of time (for example, 14:00-15:00 every day) to determine the original display screen image with the defect, marks the defect type and sends a manual result to the inference computing apparatus 100 as the correct result. In other examples, a fixed number of original product images are randomly selected for the manual judgment to obtain the manual judgment result. In other examples, original product images of a specified batch of display screens are subjected the manual judgment to obtain the manual judgment result.

For example, during a process of performing the inference computing on the data to be processed generated in the manufacturing stage based on the first inference model in S20, S30 is performed to evaluate the performance of the first inference model.

In S40, if the first inference model needs to be updated, the first inference model is updated.

In the inference computing apparatus 100 described above, it is possible to know whether the performance of the first inference model meets the inference requirements by evaluating the performance of the first inference model, or to predict a variation trend of the performance of the first inference model based on the performance evaluation result, so as to determine whether the first inference model needs to be updated. In a case where the performance of the first inference model does not meet the current inference requirements, or it is predicted that the performance of the first inference model will not meet the inference requirements, that is, in a case where it is determined that the first inference model needs to be updated, the first inference model is updated. In this way, the performance of the first inference model can be monitored, and it can be known in time and updated when its performance does not meet the inference requirements, thereby ensuring that the performance of the first inference model used by the inference computing apparatus 100 meets the requirements, and improving the accuracy of the inference result of the inference computing apparatus 100. Furthermore, the accuracy of the decision instruction made based on the inference result may be improved.

It will be noted that the application scenario of the inference computing apparatus 100 is not specifically limited herein. For example, the inference computing apparatus 100 may be used as an edge-side device. For another example, the inference computing apparatus 100 may be integrated in a user-side device (i.e. a production device).

For example, with the production of display panel as an example, the inference computing apparatus 100 obtains the original product image of the display panel in the manufacturing stage from the user-side device, and the original product image is unprocessed data that the inference computing apparatus 100 needs to process. The user-side device may include: automated optical inspection (AOI) equipment, distributed file system (DFS) or image server. The user-side device may use, for example, file transfer protocol (FTP), to capture the image of the display panel in the production process in real time as the original product image, that is, the data to be processed. It will be noted that the data to be processed is only exemplarily described as images. In fact, the data to be processed may include various forms of data, for example, it may include at least one type of unstructured data such as document file, photo, drawing, microfilm, video and audio, or it may include at least one of various unstructured information such as information managed by the library, which is not specifically limited herein.

Then the inference computing apparatus 100 performs the inference computing according to the first inference model. Herein, in an example where the first inference model is a neural network model, the neural network model identifies the defect from the original product image and then marks it with the defect information. The marked defect information includes at least one of defect type, defect location, a relationship between the defect and a circuit component of an array substrate, and defect size.

As for the defect type, the defect type for example includes: particle, remain, line, hole, splash, electrostatic breakdown, wrinkle, film color, bubble, and other types. In addition, these types can be further divided into several classes. For example, if the defect type is particles, which can be represented by P, the defects can be further divided into multiple classes according to a form of the particle. For example, P0 represents normal particles, P1 represents wall particles, and P2 represents sand particles, and so forth.

As for the defect location, the defect location for example includes at least one of a circuit board where the identified defect is located, a level where the defect lies, and a mask layer where the defect is located, etc., which points out a location of the defect. In a case where the identified defect is located on the circuit board, the defect location indicates exact coordinates of the defect on the circuit board, or, a display border like a rectangular box or a circular box can be used to select the defect, and coordinates of a point associated with a display border (for example, coordinates of a vertex of the rectangular box or a center of the circular box) can be used to indicate the coordinates of the defect.

As for the relationship between the defect and the circuit component of the array substrate, for example, it includes a number of gates covered by a defect area, and whether the defect completely falls within, intersects with or falls outside and close to the gate.

As for the defect size, it may be represented by a length and an area (such as a valid display area occupied by the defect) of the defect.

For example, the defect information described above may be further represented in various forms such as a code (for example, the codes P0~P2 corresponding to the classes of the particle type defects), coordinates, a number, and text.

In one example, the first inference model marks the identified defect with its type and location after the defect in the original product image is identified. Here, a type of the defect is correspondingly marked with the code of the type of the identified defect, and the defect location is marked in the original image with the rectangular box, with coordinate information of the rectangular box in the corresponding image recorded.

On this basis, in some embodiments, the performance of the first inference model is evaluated during the inference computing of the data to be processed by the first inference model (S30). In this case, exemplarily, evaluation parameters used to evaluate the performance of the first inference model include at least one of accuracy rate, precision rate, recall rate and F Score ($F_{Score}$) of the first inference model in the inference computing process.

Herein, the accuracy rate can be calculated by formula (1), the precision rate by the formula (2), the recall rate by the formula (3), and the $F_{Score}$ by the formula (4):

$$Accuracy=(TP+TN)/(TP+FP+TN+FN) \quad (1);$$

$$Precision=TP/(TP+FP) \quad (2);$$

$$Recall=TP/(TP+FN) \quad (3);$$

$$F_{Score}[(1+\beta^2) \cdot Precision \cdot Recall]/(\beta^2 \cdot Precision+Recall) \quad (4).$$

In this case, TP (Ture Positive) means a calculated result is positive and the actual result is also positive. That is to say, after the inference computing by the inference model, the resulting calculated result is A (A represents a result), and the actual result is also A, in which case the calculated result is consistent with the actual result.

FP (False Positive) means that the calculated result is positive while the actual result is negative. That is to say, after the inference computing by the inference model, the resulting calculated result is A while the actual result is not A, in which case the calculated result is not consistent with the actual result.

FN (False Positive) means that the calculated result is negative while the actual result is positive. That is to say, after the inference computing by the inference model, the resulting calculated result is not A while the actual result is A, in which case the calculated result is not consistent with the actual result.

TN (Ture Negative) means that the calculated result is negative and the actual result is also negative. That is to say, after the inference computing by the inference model, the resulting calculated result is not A and the actual result is also not A, in which case the calculated result is consistent with the actual result.

It will be noted that the accuracy rate, precision rate, recall rate and F Score are the evaluation parameters characterizing the performance of the first inference model. In evaluating the performance of the first inference model, the evaluation parameters selected may be determined according to an actual inference computing requirement of the inference computing apparatus 100.

For example, if the inference computing requirement of the inference computing apparatus 100 is more concerned with the accuracy rate, then the accuracy rate is used as the evaluation parameter in evaluating the performance of the inference model.

For another example, F Score is used to evaluate the performance of the first inference model. The F Score is an evaluation parameter weighted with the accuracy rate and the recall rate. Herein, $\beta$, which is used to calculate the F Score, is a weighted factor. And concerning proportions of the precision rate and the recall rate can be adjusted by changing the value of $\beta$ which can be adjusted based on an application scenario. For example, when $\beta$ is set to 1, the performance of the first inference model can be evaluated in such a manner that the precision rate and the recall rate have the same influence on the evaluation result, that is, the concerning proportions of the precision rate and the recall rate are the same.

In one example, for example, the inference computing apparatus 100 needs to judge whether 1000 pictures are of dogs or cats through the first inference model. Herein, a judging result made by the inference model 100 is a decisions made thereby. After the manual judgment, the 1000 pictures are judged to be all pictures of dogs. That is, the actual result is: the 1000 pictures are all pictures of dogs. After the inference computing by the first inference model, the obtained calculated result is: 720 pictures are of dogs, 80 pictures are of cats, and the remaining 200 pictures are unable to be identified.

In this case, the number of pictures that are judged to be of dogs in the calculated result and are indeed of dogs in the actual result is 720, and the number of pictures that are judged to be of cats in the calculated result and are indeed of cats in the actual result is zero, that is, TP is 720; the number of pictures that are judged to be of dogs in the calculated result but are not of dogs in the actual result is zero, and the number of pictures that are judged to be of cats in the calculated result but are not of cats in the actual result is 80, that is, FP is 80; the number of pictures that are judged to be not of dogs in the calculated result (which includes the number of pictures that are judged to be of cats and the number of pictures that are unable to be identified) but are of dogs in the actual result is 280; and the number of pictures that are judged to be not of cats in the calculated result but are of cats in the actual result is zero, that is, FN is 280; and the number of pictures that are judged to be not of dogs in the calculated result and are indeed not of dogs in the actual result is 0; the number of pictures that are judged to be not of cats in the calculated result (which includes the number of pictures that are judged to be dogs and the number of pictures that are unable to be identified) and are not of cats in the actual result is 920, that is, TN is 920.

By Substituting the values of TP, FP, FN and TN into the formulas (1), (2), (3) and (4), in which $\beta$ is 1, it can be concluded that the accuracy rate is 0.82, the precision rate is 0.9, the recall rate is 0.72 and the F Score is 0.8.

In some embodiments, a lower limit is set for the evaluation parameter according to actual inference computing requirements of the inference computing apparatus 100.

For example, in at least one performance evaluation of the first inference model, if the obtained evaluation parameter value is lower than the lower limit, it is determined in the evaluation result that the performance of the first inference model decreases; if the obtained evaluation parameter value is higher than or equal to the lower limit, it is determined in the evaluation result that the performance of the first inference model meets the performance requirements.

For another example, in some consecutive performance evaluations, if the obtained evaluation parameter values are sometimes higher than or equal to the lower limit and sometimes lower than the lower limit, it is determined in the evaluation result that the performance of the first inference model fluctuates; if all of the obtained evaluation parameter values are higher than or equal to the lower limit value, it is determined in the evaluation result that the performance of the first inference model meets the performance requirements.

For example, in an example where the evaluation parameter is the precision rate, the lower limit of the precision rate is set to be 0.95. If the precision rate of the first inference model is obtained to be 0.92 in a performance evaluation, the evaluation result is that the performance decreases. In another example, if the accuracy rate of the first inference model is 0.96, 0.93, 0.97, 0.92, and 0.95 in five consecutive performance evaluations, the evaluation result is that the performance fluctuates.

In some embodiments, according to the evaluation of the performance the first inference model in S30, a case where the first inference model needs to be updated includes: the performance of the first inference model fluctuates or decreases. Whether the performance of the first inference model fluctuates or decreases is determined according to a variation of the performance parameters in a continuous period of time.

Figure 6:
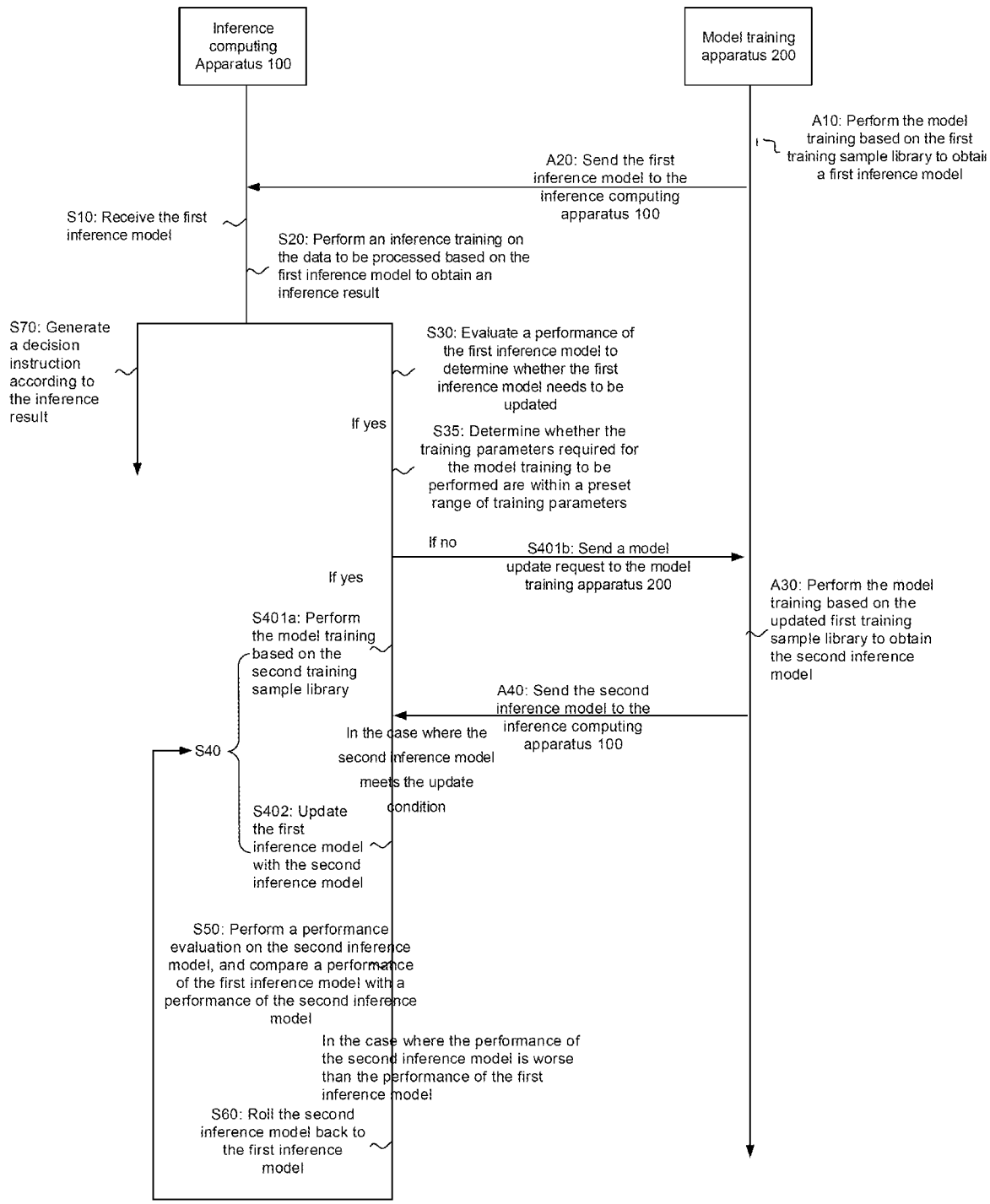
FIG. 6 is a diagram showing an interaction between another inference computing apparatus and a model training apparatus according to some embodiments of the present disclosure.

In some embodiments of the present disclosure, referring to FIGS. 3 and 6, updating the first inference model in S40 includes S401a or S401b and S402.

In S401a, a model training is performed based on a second training sample library to obtain a second inference model; or, in S401b, a model update request is sent to the model training apparatus 200 to obtain the second inference model. The second training sample library includes training samples from historical data and/or training samples that are from the inference result and subjected to a re-judging.

In S402, the first inference model is updated with the second inference model in a case where the second inference model meets an update condition.

It will be noted that the "inference result" described above refers to the inference result obtained by the first inference model through the inference computing in S20. Here, the expression "from the inference result and subjected to a re-judging" described here and below means performing a re-judging on the inference result of the first inference model, for example, performing a manual judgment on the inference result of the first inference model to obtain the production data marked with the correct result. For example, with the production of the display panel as an example, the data to be processed is the original product images of the display panel, and the original product images of the display panel are sent to the inference computing apparatus 100, and subjected to the inference computing with the first inference model to obtain the inference result. Then the product images of the display panel marked with a correct result can be obtained after the re-judging of the inference result, and these images can be used as a source of training samples of the second training library.

The second training library includes the training samples that are from the inference result and subjected to the re-judging. Since the inference result is continuously generated by the inference computing apparatus 100 in the production process, the second training library will refresh and include training samples with new features in the production data in the manufacturing stage when the images serve as the source of training samples of the second training library. In this case, it can be guaranteed that new training samples are used by the inference computing apparatus 100 in the model training. Therefore, the second inference model is able to perform a better inference computing on the newly-appearing data to be processed with new features than the first inference model. In the case where the first inference model is updated with the second inference model, the accuracy of the inference result of the inference computing apparatus 100 may be improved.

Here, as for the second training sample library in S401a, in one example, as shown in FIG. 3, the inference computing apparatus 100 includes the second training sample library, which is stored in the memory 120. In another example, the second training sample library is stored in other memories, and the inference computing apparatus 100 is able to obtain the second training sample library from these memories.

For example, referring to FIG. 3, the inference computing apparatus 100 can be used as the edge-side device, and the model training apparatus can be used as the cloud device. That is, the inference computing apparatus 100 (the edge-side device) is located closer to the user-side device than the model training apparatus 200 (the cloud device).

Further, the inference computing apparatus 100 includes a coupling interface 150. The coupling interface 150 may enable the inference computing apparatus 100 to communicate with the user-side device in a wired or wireless manner to implement information interaction. Here, the coupling interface 150 may be any hardware or software interface capable of realizing a wired or wireless connection.

The inference computing apparatus 100 further includes a network interface 140, which communicates with the model training apparatus 200 to implement the information interaction. Herein, the inference computing apparatus performs realizes information interaction with external devices (such as the model training apparatus 200) through the network interface 140 by using at least one of Transmission Control Protocol/Internet Protocol (TCP/IP), Hyper Text Transfer Protocol (HTTP), etc.

For example, the inference computing apparatus 100 communicates with the model training apparatus 200 through the network interface 140, and thus receive the first inference model or send a model update request to the model training apparatus 200 in S401b to obtain the second inference model. That is, the information interaction of the model training apparatus 200 is realized.

In some embodiments, the update condition that the second inference model shown in FIG. 6 needs to meet includes: a test is performed on the second inference model and the second inference model passes the test.

The test includes: evaluating a performance of the second inference model based on test samples. If the performance meets evaluation requirements, it is determined that the second inference model passes the test. Herein, a source of the test samples is not specifically limited. For example, the test samples are from the historical data, i.e., production data that has been marked with correct identification information.

For another example, the test samples are from data to be processed that has undergone manual judgment. For yet another example, the test samples are partly from the historical data and partly from the data to be processed that has undergone manual judgment. Obviously, the source of the test samples is not limited to these.

In addition, specific test samples may be selected from a plurality of test samples according to how often the test is performed or a test level, and at least one test plan can be made on this basis. Then the inference computing apparatus 100 performs the test on the second inference model according to the at least one test plan.

On this basis, in some embodiments, the update condition further includes: a gray-scale deployment is performed on the second inference model, the performance of the second inference model is evaluated during the gray-scale deployment, and the performance of the second inference model meets the evaluation requirements.

The "gray-scale deployment" means that the inference computing apparatus 100 performs a simulation processing using the second inference model within a preset period of time. For example, during the gray-scale deployment, the inference computing apparatus 100 processes the data to be processed sent from the user-side device using the first inference model and the second inference model simultaneously. In this process, the inference computing apparatus 100 outputs the inference result of the first inference model, while the inference result of the second inference model is only used to evaluate its performance and will not be output as the real inference result. That is, the inference computing apparatus 100 does not generate a decision instruction based on the inference result of the second inference model during the gray-scale deployment process. Therefore, the gray-scale deployment of the second inference model will not affect the processing of the data to be processed by the inference computing apparatus 100 and a normal production in the production line.

The performance of the second inference model is predicted to see if it meets the requirements by evaluating the performance of the second inference model during the simulation process. During the gray-scale deployment, the data to be processed subjected to the inference computing by the second inference model also needs to be manually judged. Herein, the result of the manual judging is used as the correct result for the inference computing apparatus 100 to compare the result of the manual judging with the inference result of the second inference model, so as to evaluate the performance of the second inference model during the gray-scale deployment process.

For example, a copy of the original product image of the display panel sent from the user-side device is sent to the inference computing apparatus 100 for the simulation process of the second inference model during the gray-scale deployment, and another copy is used for the manual judgment. The inference result and the correct result are compared by the inference computing apparatus 100 to evaluate the performance of the second inference model.

In addition, those skilled in the art will understand that in evaluating the performance of the second inference model during the gray-scale deployment, at least one of accuracy rate, precision rate, recall rate and F Score can be used as the evaluating parameter to evaluate the performance of the second inference model, which is not specifically limited herein.

It will be noted that the data to be processed subjected to the manual judgment is marked with the correct result in the test and the gray-scale deployment described above. Therefore, the data to be processed that has been marked with the correct result can be sent to the first training sample library (the first training sample library is the training sample library on which the model training apparatus 200 performs the model training) and/or the second training sample library to serve as the training samples in model training, so that the updating of the first training sample library and/or the second training sample library can be realized.

In some embodiments, the update condition further includes: configuration information of the second inference model is verified, and the configuration information of the second inference model matches with the inference computing to be performed.

Herein, the "inference computing to be performed" refers to the inference computing on the data to be processed performed by the inference computing apparatus 100. In the production process of the display panel, in an example where the defect and defect type need to be identified, the "inference computing required to be performed" means that the defects in the original product image and further their types needed to be identified by the inference computing apparatus 100. In this way, it can be detected whether the data of the second inference model is destroyed or tampered with during a transmission by performing the verification on the configuration information of the second inference model, and it may be ensured that the second inference model obtained by the inference computing apparatus 100 matches with the inference computing requirements of the inference computing 100.

In some embodiments, referring to FIG. 6, before performing the model training based on the second training sample library (S401a), or before sending the model update request to the model training apparatus 200, the inference computing apparatus 100 further performs the following operation S35.

In S35, it is determined whether training parameters required for the model training to be performed are within a preset range of training parameters. If the training parameters are within the preset range, the model training is performed (S401a). That is, in this case, the model training is performed by the inference computing apparatus 100 to obtain the second inference model. If the training parameters are not within the preset range, the model update request is sent to the model training apparatus 200. That is, in this case, the model training is performed the model training apparatus 200 to obtain the second inference model.

Herein, "the preset range of the training parameters" refers to a range of the training parameters which corresponds to the case where a training capacity of the inference computing apparatus 100 meets the requirements of the model training to be performed. That is to say, the training capacity of the inference computing apparatus 100 meets the requirements of the model training to be performed if the training parameters of the model training to be performed are within the preset range of the training parameters. In this case, the model training can be completed with the model training capacity of the inference computing apparatus 100 itself and thus the second training model will be obtained through the model training by the inference computing apparatus 100. Conversely, the training capacity of the inference computing apparatus 100 fails to meet the requirements of the model training to be performed if the training parameters of the model training to be performed are not within the preset range of the training parameters. In this case, the training capacity of the inference computing apparatus 100 is insufficient for completing the model training; therefore a model update request is required to be sent to the model training apparatus 200 to cause the model training apparatus 200 to complete the model training to obtain the second inference model. For example, the model training apparatus 200 is the cloud device.

In some embodiments, the training parameters include: at least one of data size, training duration, and computing power required for the model training.

For example, in an example where the training parameters are the data size and training duration required for the model training, the required data size for some model training is 2000 images and 2000 labels, and the required training duration is 15 minutes; the set data size is 3000 images and 3000 labels, and the set training duration is 20 minutes. In this case, the data size required for the model training is within a preset range of the data size, and the required training duration is also within a preset range of the training duration. That is to say, the training capacity of the inference computing apparatus 100 meets the requirements of model training. Then the inference computing apparatus 100 performs the model training (that is, S401a is performed).

Conversely, if the data size required for another model training is not within the preset range of data size and the required training duration is not within the preset range of training duration, which indicates that the training capacity of the edge-side device fails to meet the requirements of the model training to be performed, then the inference computing apparatus 100 sends the model update request to the model training apparatus 200 to cause the model training apparatus 200 to perform the model training.

In this way, in the case where the training capacity of the inference computing apparatus 100 meets the requirements of one model training, the inference computing apparatus 100 is caused to perform the model training, which saves the time for sending a request to the model training apparatus 200 and receiving the second inference model sent from the model training apparatus 200. Therefore, the inference model may be obtained timely and be updated for the inference computing apparatus, and the accuracy of the inference result may be improved.

In addition, in the case where the model training apparatus 200 is the cloud device, compared with a scheme in which the model training is requested to be performed by the cloud device in all cases, by causing the inference computing apparatus 100 to perform the model training autonomously when the inference computing apparatus 100 meets the requirements of the model training will decrease the burden on the cloud device, it may be possible to reduce an unnecessary occupation for the cloud device, and thus improve a resource utilization rate of the cloud device.

In some embodiments, referring to FIG. 6, in the case where the first inference model is updated with the second inference model, that is, after S402 is performed, the inference computing apparatus 100 further performs the following operations:

performing a performance evaluation on the second inference model, and comparing a performance of the first inference model with a performance of the second inference model;

if the performance of the second inference model is worse than the performance of the first inference model, rolling back the second inference model to the first inference model; and performing the model training again, or requesting the model training apparatus to perform the model training again.

In this case, in a practical process of processing the data to be processed, if the performance of the second inference model is worse than the performance of the first inference model, the inference computing apparatus 100 can roll back the updated second inference model to the first inference model before the updating. Then the inference computing apparatus 100 performs the model training again, or requests the model training apparatus 200 to perform the model training again.

Figure 7:
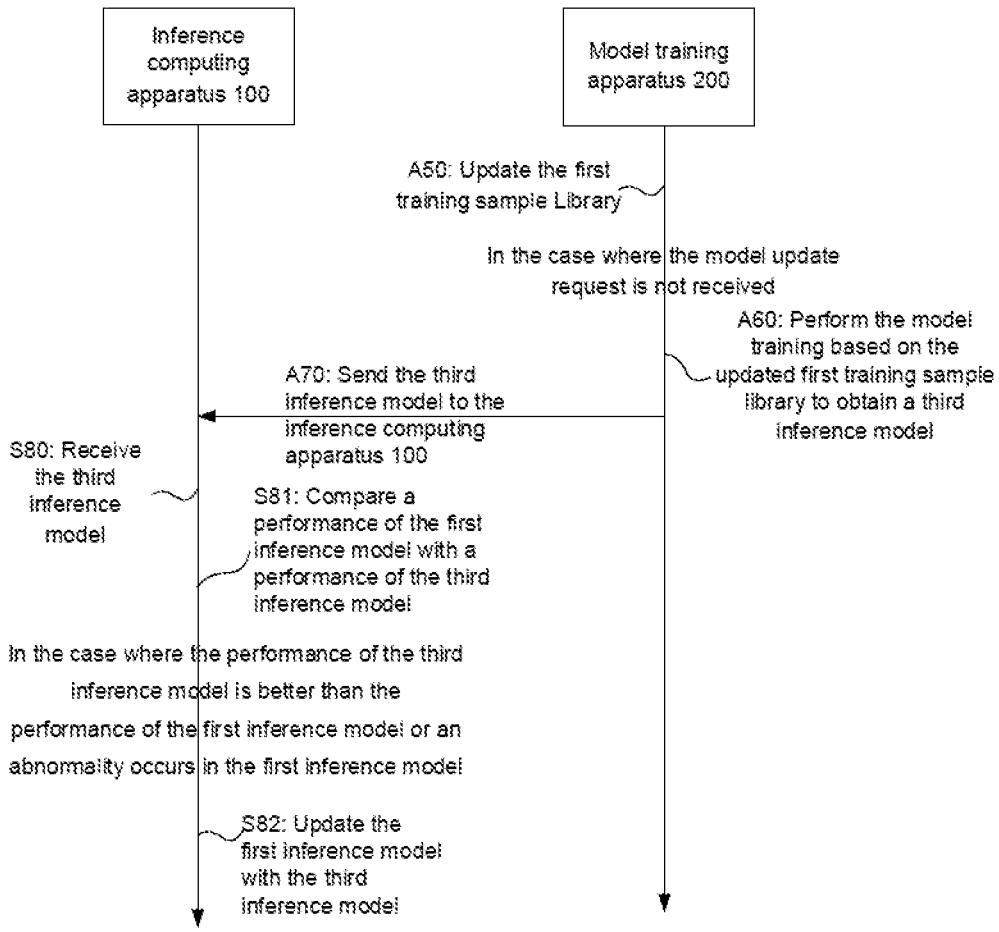
FIG. 7 is a diagram showing an interaction between yet another inference computing apparatus and a model training apparatus according to some embodiments of the present disclosure.

In some embodiments, referring to FIG. 7, updating the first inference model according to the performance evaluation of the first inference model in S30 includes S80 to S82.

In S80, a third inference model is received.

The third inference model is obtained by the model training apparatus 200 through a model training based on the updated first training sample library in a case where the model training apparatus 200 has not received the update request from the inference computing apparatus 100. The updated first training sample library includes the training samples that are from the inference result and subjected to a re-judging. That is to say, the updated first training sample library is obtained by updating the first training sample library using the training samples that are from the inference result and subjected to the re-judging.

In S81, a performance of the first inference model is compared with a performance of the third inference model.

In S82, if the performance of the third inference model is better than the performance of the first inference model, or if an abnormality occurs in the first inference model, the first inference model is updated with the third inference model.

In this way, the training samples of the updated first training sample library are relatively new and include training samples with new features that have appeared in the production data in the manufacturing stage, which ensures that relatively new training samples can be used by the model training apparatus 200 in the model training. Therefore, the third inference model is able to perform a better inference computing on the newly-appearing data with new features than the first inference model. In the case where the first inference model is updated with the third inference model, the accuracy of the inference result of the inference computing apparatus 100 may be improved.

In addition, the case where an abnormality occurs in the first inference model means that the first inference model is unable to output the inference result correctly. For example, the performance of the first inference model suddenly decreases; or, the first inference model does not output the inference result according to the requirements; or, the inference computing of the first inference model takes too long or with a serious timeout. In other words, the third inference model can be used as a backup inference model to replace the first inference model when an abnormal condition occurs in the first inference model. In addition, in the case where the first inference model needs to be updated after the performance of the first inference model is evaluated, that is to say, the performance of the first inference model no longer meets the requirements. The third inference model is used to process the data to be processed in replace of the first inference model that fails to meet the requirements during a period when the inference computing apparatus 100 or the model training apparatus 200 performs the model training, so as to ensure the normal operation of the inference computing apparatus 100.

In some embodiments, referring to FIG. 6, after obtaining the inference result (S20), the inference computing apparatus 100 further performs the following operation S70: generating a decision instruction according to the inference result.

The defect information includes: an identified original product image having the defect, and defect location and defect type. The decision instruction includes: performing a defect processing on a product corresponding to the original product image having the defect. For example, a repairing strategy for a type of the defect is given according to the identified defect type. For another example, a reason for which this type of defect possibly occurs is given based on an analysis of the historical data, such as malfunction in one or several process devices or some unreasonably set process parameters. For another example, an alarm is issued when an unknown defect or large-scale defects occurs.

It will be noted that the decision instruction may not be generated by the inference computing apparatus 100. For example, the inference computing apparatus 100 uploads the inference result to the cloud device after obtaining it. Then the cloud device performs the computing analysis on the inference result to generate the decision instruction, and sends the decision instruction back to the inference computing apparatus 100. In this case, the inference computing apparatus 100, as the edge-side device in the user-edge-cloud architecture mentioned above, sends the inference result to the cloud device after the data to be processed is preliminary processed (the inference computing) by the edge-side device. The cloud device is able to generate the decision instruction with its strong computing power and send it to the edge-side device. In this way, a unified planning, management, and configuration on production equipment may be achieved.

Referring to FIGS. 5 and 6, some embodiments of the present disclosure further provide a model training apparatus 200, which includes at least one processor 210 and a memory 220. The memory 220 has stored therein program instructions that, when executed by the at least one processor 210, cause the model computing apparatus 200 to perform the following operations A10 to A40.

In A10, a model training is performed based on a first training sample library to obtain a first inference model. The first training sample library includes training samples that are from historical data generated in a manufacturing stage.

Here, the historical data also refers to the production data that has been manually judged, and is the production data marked with the correct result.

For example, the model training apparatus 200 further includes the first training sample library, which is stored in the memory 220. For another example, the first training sample library is stored in memories other than the memory 220.

In A20, the first inference model is sent to the inference computing apparatus 100.

In a case where a model update request is received from the inference model 100, In A30, a model training is performed based on an updated first training sample library to obtain a second inference model. The updated first training sample library includes training samples that are from an inference result of the first inference model and subjected to a re-judging.

In A40, the second inference model is sent to the inference computing apparatus 100.

Since the training samples in the updated first training sample library, which includes training samples with new features that appear in the production data in the manufacturing stage, are relatively new, it may be guaranteed that the model training apparatus 200 uses the relatively new training samples in the model training. The second inference model obtained after the model training based on the updated first training sample library has stronger inference computing capabilities for newly-appearing data to be processed with new features. In the case where the first inference model is updated with the second inference model, the accuracy of the inference result of the inference computing apparatus 100 may be improved.

For example, referring to FIG. 5, the model training apparatus 200 further includes a network interface 240. The model training apparatus 200 can communicate with other devices (e.g., user-side device and/or the model training apparatus 200) through the network interface 240 to realize information interaction.

Herein, the model training apparatus 200 realizes the information interaction with external apparatuses (such as the model training apparatus 100) through the network interface 240 by using at least one of Transmission Control Protocol/Internet Protocol (TCP/IP), Hyper Text Transfer Protocol (HTTP), etc.

For example, the model training apparatus 200 communicates with the inference computing model 100 through the network interface 240, so as to send the first inference model to the inference computing apparatus 100, or receive the model update request from the inference computing apparatus 100, or send the second inference model to the inference computing apparatus 100.

Figure 8:
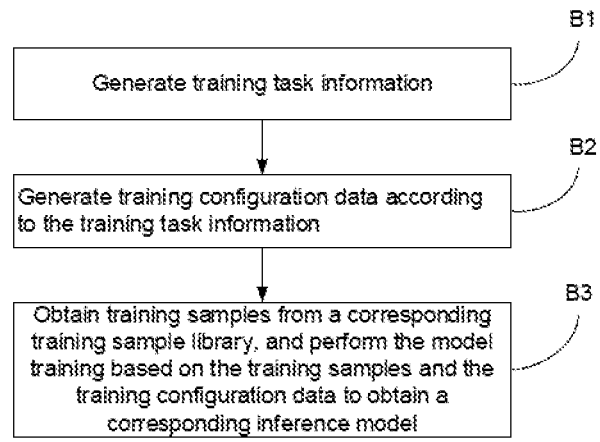
FIG. 8 is a flow chart of operation steps of a model training apparatus according to some embodiments of the present disclosure.

In some embodiments, in a process of performing the model training based on the first training sample library (i.e., A10), or in a process of performing the model training based on the updated first training sample library (i.e., A30), referring to FIG. 8, the model training apparatus 200 performs the following operations B1 to B2.

In B1, training task information is generated.

In B2, training configuration data is generated according to the training task information.

In B3, training samples are obtained from a corresponding training sample library and the model training is performed based on the training samples and the training configuration data to obtain a corresponding inference model.

The "corresponding training sample library" and the "corresponding inference model" mentioned here and below are defined relative to the model training to be performed. That is to say, if A10 is performed, the first inference model will be obtained through the model training based on the training samples from the first training sample library. If A30 is performed, the second inference model will be obtained through the model training based on the training samples from the updated first training sample library.

In addition, the training task information is generated according to the received model update request sent from the inference computing apparatus 100, and it includes training requirements for the model training. For example, the second inference model obtained through the model training is required to have a specific inference computing function and to be able to obtain a computing result.

The training configuration data includes training schedule information generated according to the training requirements. The training samples that need to be called in the model training can be known according to the training schedule information. For example, the training schedule information includes a data identifier, through which the training samples that need to be called in the model training can be found.

Figure 9:
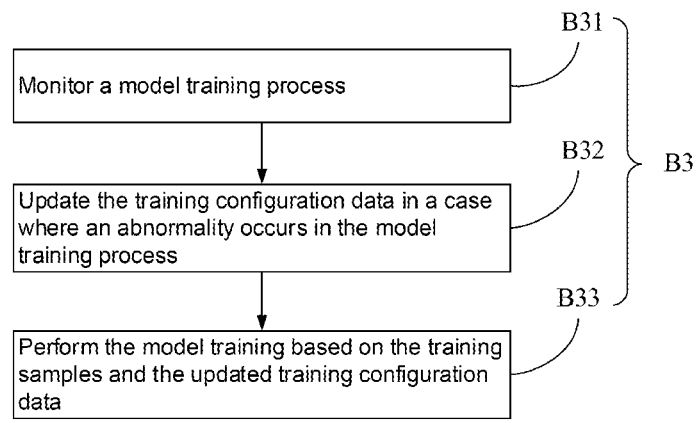
FIG. 9 is a flow chart of operation steps of another model training apparatus according to some embodiments of the present disclosure.

For example, referring to FIG. 9, during a process of performing the model training in B3, the model training apparatus 200 further performs the following operations B31 to B33.

In B31, a model training process is monitored.

In B32, the training configuration data is updated when an abnormality occurs in the model training process.

In B33, the model training is performed based on the training samples and the updated training configuration data.

In some embodiments, before sending the first inference model to the inference computing apparatus 100 (i.e., before A20 in FIG. 6), or before sending the second inference model to the inference computing apparatus 100 (i.e., before A40 in FIG. 6), the model training apparatus 100 further performs the following operations.

Model version information of the corresponding inference model is verified to determine whether the model version information is correct.

If the model version information is correct, the corresponding inference model is sent to the inference computing apparatus 100.

Herein, in the case where the first inference model is sent, if the model version information is determined to be correct, A20 is performed; and in the case where the second inference model is sent, if the model version information is determined to be correct, A40 is performed.

If the model version information is incorrect, a corresponding inference model with a model version meeting the requirements is searched. If the corresponding inference model is found, the corresponding inference model is sent to the inference computing apparatus 100; and if the corresponding inference model is not found, a notification message is sent to the inference computing apparatus 100.

The inference computing apparatus 100 may request the model training apparatus to perform the model training again based on the received notification message, or it may stop the operation.

In this way, by verifying the model version information before sending the first inference model or the second inference model, it may be possible to ensure that a correct version of the first inference model or the second inference model is sent to the inference computing apparatus 100.

In some embodiments, referring to FIGS. 5 and 7, the model training apparatus 200 includes the first training sample library, and the model training apparatus 200 further performs the following operations A50 to A70.

In A50, the first training sample library is updated.

In A60, the model training is performed based on the updated first training sample library to obtain a third inference model in a case where the model update request is not received from the inference computing apparatus 100.

In A70, the third inference model is sent to the inference computing apparatus 100.

It will be noted that the third inference model is obtained by the model training apparatus 200 through the model training in the case where the model training apparatus 200 has not received the model update request. That is to say, the third inference model is obtained by the model training apparatus 200 after performing a model training on its own based on the updated first training sample library.

Since the third inference model has been introduced in detail above, details will not be repeated here.

Some embodiments of the present disclosure further provide a computer-readable storage medium, which is provided in the inference computing apparatus 100 as described in any of the above embodiments. The computer-readable storage medium has stored therein program instructions that, when executed by the at least one processor 110 in the inference computing apparatus 100, cause the inference computing apparatus 100 to perform the following operations S10 to S40.

In S10, a first inference model is received. The first inference model is obtained through a model training based on a first training sample library, and the first training sample library includes training samples from historical data.

In S20, an inference computing is performed on data to be processed generated in a manufacturing stage based on the first inference model to obtain an inference result.

In S30, a performance of the first inference model is evaluated to determine whether the first inference model needs to be updated.

In S40, if the first inference model needs to be updated, the first inference model is updated.

The computer-readable storage medium is also able to improve the accuracy of the inference result, and details will not be repeated here.

Some embodiments of the present disclosure further provide a computer-readable storage medium, which is provided in the inference computing apparatus 200 as described in any of the above embodiments. The computer-readable storage medium stores program instructions therein, when executed by the at least one processor 210 in the inference computing apparatus 200, the program instructions cause the inference computing apparatus 200 to perform the following operations A10 to A40.

In A10, a model training is performed based on a first training sample library to obtain a first inference model. The first training sample library includes training samples from historical data.

In A20, the first inference model is sent to an inference computing apparatus 100.

In a case where a model update request is received from the inference computing apparatus 100, In A30, a model training is performed based on an updated first training sample library to obtain the second inference model. The updated first training sample library is obtained by updating the first training sample library using training samples that are from an inference result of the first inference model and subjected to a re-judging.

In A40, the second inference model is sent to the inference computing apparatus 100.

The computer-readable storage medium is also able to improve the accuracy of the inference result, and details will not be repeated here.

Figure 10:
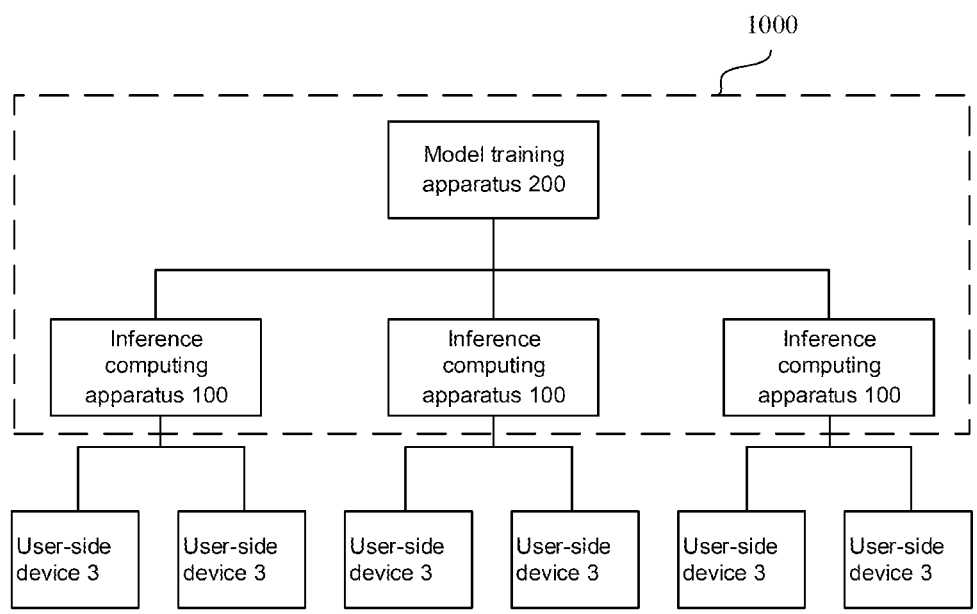
FIG. 10 is a structural view of an inference computing system according to some embodiments of the present disclosure.

Some embodiments of the present disclosure further provide an inference computing system 1000. As shown in FIG. 10, the inference computing system includes the inference computing apparatus 100 as described in any of the above embodiments, and the model training apparatus 200 as described in any of the above embodiments.

Since the inference computing apparatus 100 and the model training apparatus 200 included in the inference computing system 1000 are able to improve the accuracy of the inference result, the model deployment system 1000 is also able to improve the accuracy of the inference result, and details will not be repeated here.

It will be noted that the processors (such as the processor 110 and the processor 210) mentioned in the present disclosure may be a central processing unit (CPU), a general purpose processor (GPP), a digital signal processor (DSP), an application-specific integrated circuit (ASIC), a field programmable gate array (FPGA), or other programmable logic devices, transistor logic devices, hardware components or any combination thereof. These processors are able to realize or implement all the exemplary logic blocks and modules described in the present disclosure. The processor 210 can be a combination for realizing computing functions. For example, the processor 210 may be a combination of one or more microprocessors, a combination of DSP and microprocessor, etc.

In addition, the memories (such as the memory 120 and the memory 220) mentioned in the embodiments of the present disclosure may be a random access memory (RAM), a flash memory, a read-only memory (ROM), an erasable programmable ROM (EPROM), an electrically EPROM (EEPROM), a register, a hard drive, a removable hard drive, a compact disc read-only memories (CD-ROM) or any other storage media known in the art.

Some embodiments of the present disclosure provide an inference computing apparatus 300. In a case where function modules are divided according to respective functions, referring to FIG. 11, the inference computing apparatus 300 includes: a performance evaluation module 11, an inference model module 13 and a model task management module 14.

The model task management module 14 is configured to receive the first inference model from the model training apparatus 400. The inference model module 13 is configured to perform an inference computing on the data to be processed (from the user-side device 3) generated in the manufacturing stage based on the received first inference model to obtain an inference result, and send the inference result to the user-side device 3. The performance evaluation module 11 is configured to evaluate the performance of the first inference model to determine whether the first inference model needs to be updated. And if the first inference model needs to be updated, the first inference model will be updated by the model task management module 14.

In some embodiments of the present disclosure, the inference computing apparatus 300 further includes a second model training module 12 and a second sample training library 19. In the case where the first inference model needs to be updated, the second model training module 12 is configured to perform the model training based on the second training sample library 19 to obtain the second inference model; or, the performance evaluation module 11 is further configured to send a model update request to the model training apparatus 400 to obtain the second inference model. The second training sample library 19 has stored therein a training sample required for the model training, and the training sample may be from the inference model module 13 and/or the model task management module 14.

On this basis, in some embodiments, the model task management module 14 is further configured to receive the second inference model from the model training apparatus 400, and perform at least one of a test, a gray-scale deployment or a configuration information verification on the received second inference model.

Figure 11:
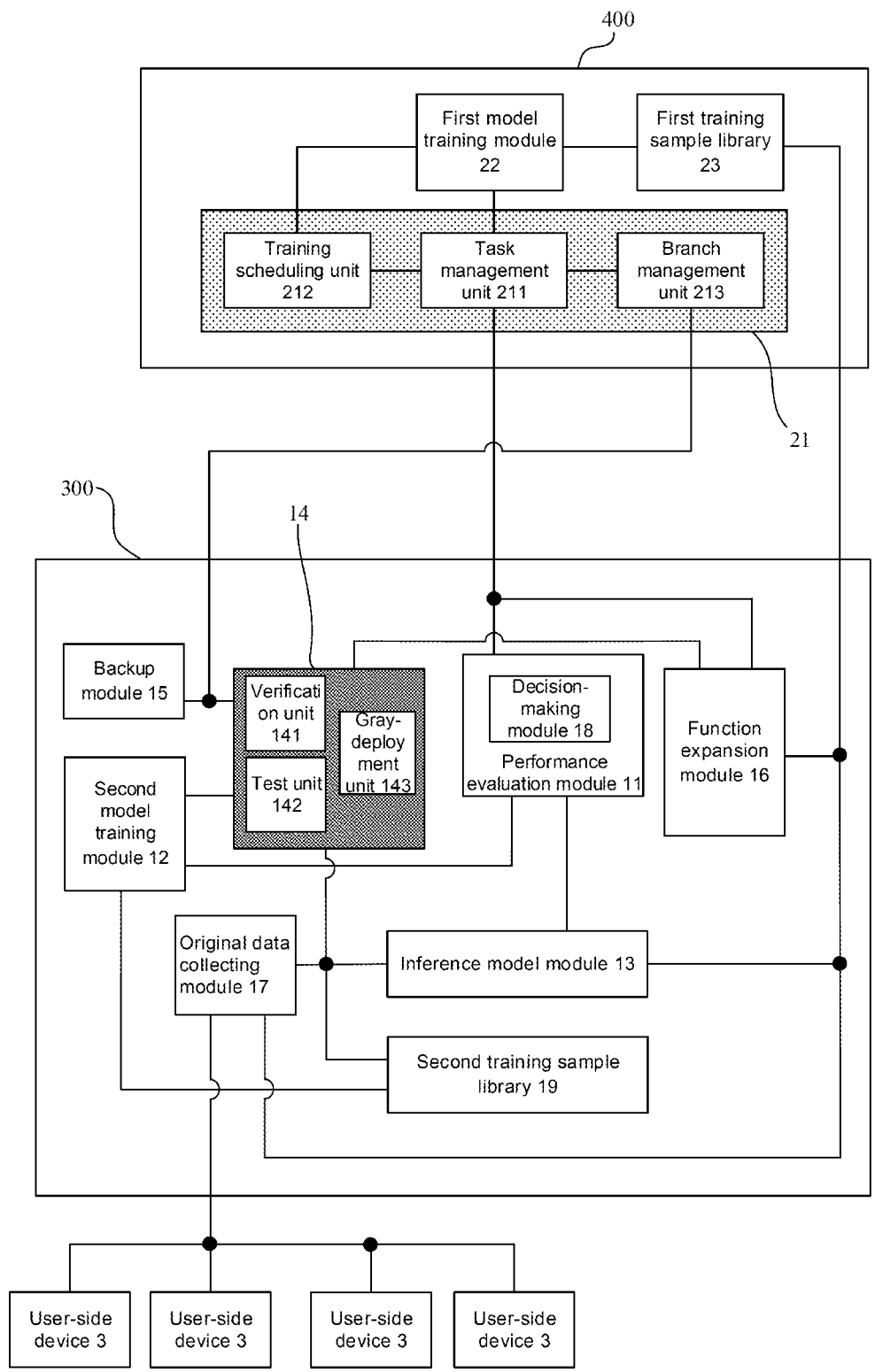
FIG. 11 is a structural view of an inference computing apparatus and a model training apparatus according to some embodiments of the present disclosure.

For example, referring to FIG. 11, the model task management module 14 includes: a verification unit 141, a test unit 142, and a gray-scale deployment unit 143.

The verification unit 141 is configured to verify the received second inference model; the test unit 142 is configured to perform the test on the received second inference model; and the gray-scale deployment unit 143 is configured to perform the gray-scale deployment on the received second inference model.

In some embodiments, the inference computing apparatus 300 further includes a model training decision-making module 18, which is configured to determine whether training parameters required for the model training are within a preset range of the training parameters. If the training parameters are within the preset range, the performance evaluation module 11 is caused to send a model update request to the second model training module 12, that is, the second model training module 12 is caused to perform the model training to obtain the second inference model; if the training parameters are not within the preset range, the performance evaluation module 11 is caused to send the model update request to the model training apparatus 400, that is, the model training apparatus 400 is caused to perform the model training to obtain the second inference model.

In some embodiments of the present disclosure, the inference computing apparatus 300 further includes a backup module 15, which is configured to receive the third inference model. In the case where the performance of the third inference model is better than the performance of the first inference model in the inference model module 11, or in the case when an abnormality occurs in the first inference model in the inference model module 11, the backup module 15 sends the third inference model to the model task management module 14, and the model task management module 14 updates the first inference model with the third inference model.

In some embodiments, the performance evaluation module 11 is further configured to evaluate the performance of the second inference model and compare the performance of the first inference model with the performance of the second inference model. In the case where the performance of the second inference model is worse than the performance of the first inference model, the model task management module 14 is further configured to roll back the second inference model to the first inference model. The performance evaluation module 11 is further configured to send the model training request to the second model training module 12 or the model training apparatus 400 again.

In some embodiments, referring to FIG. 11, the inference computing apparatus 300 further includes a function expansion module 16, which is configured to expand or modify the functions of the inference model module 13 and the task management module 14.

For example, the function expansion module 16 receives an imported inference model and controls the inference model in the inference model module 13 to be switched to the imported inference model.

In addition, referring to FIG. 11, in the case where the model training apparatus 400 includes the first training sample library 23, the function expansion module 16 may also be able to expand the functions of the first training sample library.

For example, the function expansion module 16 includes a function expansion interface.

In some embodiments, referring to FIG. 11, the inference computing apparatus 300 further includes: an original data collecting module 17 and an inference model module 13.

The original data collecting module 17 is configured to collect the original data from the user-side device 3 to obtain the data to be processed, and send the data to be processed to the inference model module 13.

Some embodiments of the present disclosure provide a model training apparatus 400. In the case where function modules are divided according to respective functions, referring to FIG. 11, the model training apparatus 400 includes: a training management module 21, a first model training module 22 and a first training sample library 23.

The first model training module 22 is configured to perform a model training based on the first training sample library 23 to obtain the first inference model, and/or perform a model training based on the updated first training sample library 23 to obtain the second inference model.

The training management module 21 is configured to send the first training model and/or the second training model to the inference computing apparatus 300.

For example, referring to FIG. 11, the model task management module 21 includes: a task management unit 211, a training scheduling unit 212, and a branch management unit 213.

The task management unit 211 is configured to generate training task information according to the model update request sent by the inference computing apparatus 300. The training scheduling unit 212 is configured to generate training configuration data according to the training task information and obtain training samples from a corresponding training sample library. The branch management unit 213 is configured to verify model version information of the corresponding inference model to determine whether the model version information is correct. In the case where the model version information is correct, the branch management unit 213 is further configured to send the corresponding inference model with the correct version information to the inference computing apparatus 300.

For example, the training scheduling unit 212 is further configured to monitor a model training process of the first model training module 22, update the training configuration data when an abnormality occurs in the model training process, and send the updated training configuration data to the first model training module 22. In this case, the first model training module 22 is further configured to perform the model training according to the updated training configuration data and the training samples.

In some embodiments, referring to FIG. 11, the model training apparatus 400 further includes a first training sample library 23, which is configured to receive the training samples marked with the correct result sent by the inference computing apparatus 300. For example, after being re-judged and marked with the correct result, the inference result of the inference model module 13 of the inference computing apparatus 300 is sent to the first training sample library 23 to update the first training sample library 23. In this case, the first model training module 22 is further configured to perform the model training based on the updated first training sample library 23 to obtain the third inference model in the case where the model update request is not received.

For example, in the case where the training management module 21 includes the branch management unit 213, the first model training module 22 is configured to send the third inference model to the branch management unit 213, and then the branch management unit 213 sends the third inference model to the inference computing apparatus 300.

The forgoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. An inference computing apparatus, comprising at least one processor and a memory, wherein the memory has stored therein program instructions that, when executed by the at least one processor, cause the inference computing apparatus to perform following operations:
receiving a first inference model from a model training apparatus, the first inference model being obtained by the model training apparatus through a first model training based on a first training sample library, the first training sample library including first training samples from historical data generated in a manufacturing stage, and the model training apparatus including a cloud device;
performing an inference computing on data to be processed generated in the manufacturing stage based on the first inference model to obtain an inference result, and sending the inference result to a user-side device, the inference computing apparatus being closer to the user-side device than the model training apparatus;
evaluating a performance of the first inference model to determine whether the first inference model needs to be updated; and
updating the first inference model when the first inference model needs to be updated, wherein updating the first inference model includes:
performing a second model training based on a second training sample library to obtain a second inference model, or sending a model update request to the model training apparatus to obtain the second inference model, the second training sample library including: second training samples from the historical data, third training samples being from the inference result and subjected to re-judging, or the second training samples from the historical data and the third training samples being from the inference result and subjected to re-judging; and
updating the first inference model with the second inference model in a case where the second inference model meets an update condition, wherein the update condition includes that:
a test is performed on the second inference model and the second inference model passes the test, wherein the test includes: evaluating a performance of the second inference model based on test samples; and when the performance of the second inference model meets evaluation requirements, determining that the second inference model passes the test; and
a gray-scale deployment is performed on the second inference model, the performance of the second inference model is evaluated during the gray-scale deployment, and the performance of the second inference model meets the evaluation requirements, wherein the gray-scale deployment is that the inference computing apparatus performs a simulation processing using the second inference model within a preset period of time;
wherein before performing the second model training to obtain the second inference model, or before sending the model update request to the model training apparatus to obtain the second inference model, the inference computing apparatus further performs following operations:
determining whether training parameters required for the second model training to be performed are within a preset range of the training parameters; and when the training parameters are within the preset range, performing the second model training; when the training parameters are not within the preset range, sending the model update request to the model training apparatus, wherein the training parameters include at least one of data size, training duration and computing power required for the second model training, and the preset range of the training parameters is a range of the training parameters which corresponds to the case where a training capacity of the inference computing apparatus meets the requirements of the second model training to be performed.

2. The inference computing apparatus according to claim 1, wherein
the historical data includes a product image marked with defect information having a correct result;
the data to be processed includes an original product image generated in the manufacturing stage; and
the inference result includes defect information of the original product image.

3. The inference computing apparatus according to claim 2, wherein after obtaining the inference result, the inference computing apparatus further performs following operations:
generating a decision instruction according to the inference result; wherein
the defect information of the original product image includes: the identified original product image having a defect, and defect location and defect type; and the decision instruction includes: performing a corresponding defect processing on a product corresponding to the original product image having the defect according to the defect information of the original product image.

4. The inference computing apparatus according to claim 1, wherein the update condition further includes that:
configuration information of the second inference model is verified, and the configuration information matches with the inference computing to be performed.

5. The inference computing apparatus according to claim 1, wherein evaluation parameters used for evaluating the performance of the first inference model include at least one of accuracy rate, precision rate, recall rate and F Score of the first inference model during an inference computing process;
a case where the first inference model needs to be updated according to the performance evaluation includes: the performance of the first inference model fluctuates or decreases, wherein whether the performance of the first inference model fluctuates or decreases is determined according to a variation of the evaluation parameters in a continuous period of time.

6. The inference computing apparatus according to claim 1, wherein updating the first inference model according to the performance evaluation includes:
receiving a third inference model, the third inference model being obtained by the model training apparatus through a third model training based on an updated first training sample library in a case where the model training apparatus has not received the model update request, and the updated first training sample library including the third training samples being from the inference result and subjected to re-judging;
comparing the performance of the first inference model with a performance of the third inference model, and when the performance of the third inference model is better than the performance of the first inference model, or when an abnormality occurs in the first inference model, updating the first inference model with the third inference model.

7. The inference computing apparatus according to claim 1, wherein in a case where the first inference model is updated with the second inference model, the inference computing apparatus further performs following operations:
performing the performance evaluation on the second inference model, and comparing the performance of the first inference model with the performance of the second inference model;
when the performance of the second inference model is worse than the performance of the first inference model, rolling back the second inference model to the first inference model; and performing the second model training again, or requesting the model training apparatus to perform the second model training again.

8. A model training apparatus, comprising at least one processor and a memory, wherein the memory has stored therein program instructions that, when executed by the at least one processor, cause the model training apparatus to perform following operations:
performing a first model training based on a first training sample library to obtain a first inference model, the first training sample library including first training samples from historical data generated in a manufacturing stage;
sending the first inference model to an inference computing apparatus;
performing a second model training based on an updated first training sample library to obtain a second inference model in a case where a model update request is received from the inference computing apparatus, the updated first training sample library including third training samples being from an inference result of the first inference model and subjected to re-judging; and
sending the second inference model to the inference computing apparatus, wherein
the first inference model is updated with the second inference model in a case where the second inference model meets an update condition, and the update condition includes that:
a test is performed on the second inference model and the second inference model passes the test, wherein the test includes: evaluating a performance of the second inference model based on test samples; and when the performance of the second inference model meets evaluation requirements, determining that the second inference model passes the test; and
a gray-scale deployment is performed on the second inference model, the performance of the second inference model is evaluated during the gray-scale deployment, and the performance of the second inference model meets the evaluation requirements, wherein the gray-scale deployment is that the inference computing apparatus performs a simulation processing using the second inference model within a preset period of time;
wherein before the model update request being received from the inference computing apparatus, the inference computing apparatus performs following operations:
determining whether training parameters required for the second model training to be performed are within a preset range of the training parameters; and when the training parameters are within the preset range, performing the second model training; when the training parameters are not within the preset range, sending the model update request to the model training apparatus, wherein the training parameters include at least one of data size, training duration, and computing power required for the second model training, and the preset range of the training parameters is a range of the training parameters which corresponds to the case where a training capacity of the inference computing apparatus meets the requirements of the second model training to be performed.

9. The model training apparatus according to claim 8, wherein in a process of performing the first model training based on the first training sample library or performing the second model training based on the updated first training sample library, the model training apparatus performs following operations:
- generating training task information;
- generating training configuration data according to the training task information; and
- obtaining corresponding training samples from a corresponding training sample library and performing a corresponding model training based on the obtained corresponding training samples and the training configuration data to obtain a corresponding inference model.

10. The model training apparatus according to claim 9, wherein in a process of obtaining the corresponding training samples from the corresponding training sample library and performing the corresponding model training based on the obtained corresponding training samples and the training configuration data to obtain the corresponding inference model, the model training apparatus further performs following operations:
- monitoring a corresponding model training process;
- updating the training configuration data when an abnormality occurs in the corresponding model training process; and
- performing the corresponding model training based on the obtained corresponding training samples and the updated training configuration data.

11. The model training apparatus according to claim 8, before sending the first inference model or the second inference model to the inference computing apparatus, the model training apparatus further performs following operations:
- verifying model version information of a corresponding inference model to determine whether the model version information is correct;
- when the model version information is correct, sending the corresponding inference model to the inference computing apparatus; and
- when the model version information is not correct, searching for a corresponding inference model with a model version meeting requirements; when the corresponding inference model with the model version meeting requirements is found, sending the corresponding inference model with the model version meeting requirements to the inference computing apparatus; and when the corresponding inference model with the model version meeting requirements is not found, sending a notification message to the inference computing apparatus.

12. The model training apparatus according to claim 8, further comprising the first training sample library, wherein the model training apparatus further performs following operations:
- updating the first training sample library;
- performing a third model training based on the updated first training sample library to obtain a third inference model in a case where the model update request is not received; and
- sending the third inference model to the inference computing apparatus.

* * * * *